United States Patent
Tsujita et al.

(10) Patent No.: US 10,120,146 B2
(45) Date of Patent: Nov. 6, 2018

(54) OPTO-ELECTRIC HYBRID MODULE

(71) Applicant: NITTO DENKO CORPORATION, Ibaraki-shi, Osaka (JP)

(72) Inventors: Yuichi Tsujita, Ibaraki (JP); Naoki Shibata, Ibaraki (JP); Naoyuki Tanaka, Ibaraki (JP); Shotaro Masuda, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 0 days.

(21) Appl. No.: 14/784,384

(22) PCT Filed: Mar. 7, 2014

(86) PCT No.: PCT/JP2014/055893
§ 371 (c)(1),
(2) Date: Oct. 14, 2015

(87) PCT Pub. No.: WO2014/171218
PCT Pub. Date: Oct. 23, 2014

(65) Prior Publication Data
US 2016/0070075 A1  Mar. 10, 2016

(30) Foreign Application Priority Data
Apr. 18, 2013 (JP) .................. 2013-087265

(51) Int. Cl.
*G02B 6/36* (2006.01)
*G02B 6/42* (2006.01)

(52) U.S. Cl.
CPC ............. *G02B 6/423* (2013.01); *G02B 6/428* (2013.01); *G02B 6/4214* (2013.01); *G02B 6/4283* (2013.01); *G02B 6/4293* (2013.01)

(58) Field of Classification Search
CPC ..................... G02B 6/3817; G02B 6/4202
See application file for complete search history.

(56) References Cited

U.S. PATENT DOCUMENTS 6,999,323 B1 * 2/2006 Aronson ............. G02B 6/4201
  361/753
7,197,221 B2 * 3/2007 Ohtsu ..................... G02B 6/43
  385/130

(Continued)

FOREIGN PATENT DOCUMENTS

CN  1469148 A  1/2004
CN  1761107 A  4/2006

(Continued)

OTHER PUBLICATIONS

Notification of Transmittal of Translation of the International Preliminary Report on Patentability (Form PCT/IB/338) issued in counterpart International Application No. PCT/JP2014/055893 dated Oct. 29, 2015 with Forms PCT/IB/373 and PCT/ISA/237 (11 pages).

(Continued)

*Primary Examiner* — Sung Pak
*Assistant Examiner* — Hoang Tran
(74) *Attorney, Agent, or Firm* — Westerman, Hattori, Daniels & Adrian, LLP (57) ABSTRACT

There is provided an opto-electric hybrid module in which an optical element of an optical element unit and a core of an optical waveguide of an opto-electric hybrid unit are aligned with each other simply and precisely. This opto-electric hybrid module includes: a connector including an optical element; and an opto-electric hybrid unit including an electric circuit board and an optical waveguide which are stacked together. The connector includes aligning protrusions positioned and formed in a predetermined position with respect to the optical element. The opto-electric hybrid unit 2 includes recesses for fitting engagement with the aligning protrusion, the recesses being positioned and (Continued)

formed in a predetermined position with respect to an end surface of a core of the optical waveguide.

4 Claims, 10 Drawing Sheets

(56) References Cited

U.S. PATENT DOCUMENTS

| | | | |
|---|---|---|---|
| 2001/0012412 A1* | 8/2001 | Schulman | H01L 27/14601 382/312 |
| 2004/0028349 A1 | 2/2004 | Nagasaka et al. | |
| 2006/0067608 A1 | 3/2006 | Kobayashi et al. | |
| 2007/0019914 A1* | 1/2007 | Ohtsu | G02B 6/43 385/89 |
| 2008/0090450 A1 | 4/2008 | Harano et al. | |
| 2008/0279501 A1 | 11/2008 | Juni | |
| 2009/0175579 A1 | 7/2009 | Tanaka et al. | |
| 2009/0297095 A1* | 12/2009 | Matsuoka | G02B 6/4249 385/14 |
| 2012/0114283 A1* | 5/2012 | Shimotsu | G02B 6/4284 385/27 |
| 2012/0183264 A1 | 7/2012 | Shimotsu et al. | |
| 2012/0237158 A1 | 9/2012 | Inoue et al. | |
| 2012/0251036 A1 | 10/2012 | Inoue et al. | |
| 2013/0051736 A1 | 2/2013 | Chang | |
| 2013/0148931 A1 | 6/2013 | Nekado et al. | |
| 2013/0259423 A1* | 10/2013 | Charbonneau-Lefort | G02B 6/4206 385/33 |

FOREIGN PATENT DOCUMENTS

| | | |
|---|---|---|
| CN | 101421650 A | 4/2009 |
| CN | 101999198 A | 3/2011 |
| JP | 2008-089879 A | 4/2008 |
| JP | 2008-281780 A | 11/2008 |
| JP | 2009-86256 A | 4/2009 |
| JP | 2009-223063 A | 10/2009 |
| JP | 2011-22198 A | 2/2011 |
| JP | 2011-22199 A | 2/2011 |
| JP | 2012-194401 A | 10/2012 |
| JP | 2012-208306 A | 10/2012 |
| WO | 2006/068045 A1 | 6/2006 |
| WO | 2009/045366 A1 | 4/2009 |
| WO | 2011/008729 A2 | 1/2011 |

OTHER PUBLICATIONS

International Search Report dated Jun. 17, 2014, issued in counterpart application No. PCT/JP2014/055893 (2 pages).
Office Action with Search Report dated Apr. 25, 2016, issued in counterpart Chinese Patent Application No. 201480016968.1, with English translation. (15 pages).
Office Action dated Jan. 13, 2017, issued in counterpart Chinese Patent Application No. 201480016968.1, with English transaltion. (11 pages).
Office Action dated Dec. 6, 2016, issued in counterpart Japanese Patent Application No. 2013-087265, with English translation. (9 pages).
Office Action dated Jul. 4, 2017, issued in counterpart Chinese Patent Application No. 201480016968.1, with English transaltion. (13 pages).
Office Action dated Aug. 1, 2017, issued in counterpart Japanese Patent Application No. 2013-087265, with English translation. (6 pages).
Office Action dated May 5, 2017, issued in counterpart Taiwanese Application No. 103107876, with English translation (7 pages).

* cited by examiner

OPTO-ELECTRIC HYBRID MODULE

TECHNICAL FIELD

The present invention relates to an opto-electric hybrid module in which an opto-electric hybrid unit including an electric circuit board and an optical waveguide which are stacked together and an optical element unit including an optical element are coupled together so as to be capable of light propagation.

BACKGROUND ART

With the increase in the amount of transmission information, optical interconnect lines for transmitting optical signals in addition to electrical interconnect lines have been used in recent electronic devices and the like. Specifically, an opto-electric hybrid module including an opto-electric hybrid unit in which an optical waveguide serving as optical interconnect lines is stacked on an electric circuit board having electrical interconnect lines formed thereon, and an optical element unit in which an optical element such as a light-emitting element for converting an electric signal into an optical signal and a light-receiving element for converting an optical signal into an electric signal is mounted is incorporated in such an electronic device as described above.

In the opto-electric hybrid module, it is necessary that light emitted from the light-emitting element enters one end surface (light entrance) of each core (optical interconnect line) of the optical waveguide and that the light-receiving element receives light exiting from the other end surface (light exit) of each core. It is hence necessary that the optical elements (light-emitting element and light-receiving element) and the cores are aligned with each other so as to be capable of light propagation.

A method capable of simply aligning the optical element and the core with each other has been hitherto proposed (see PTL 1, for example). In this method, an alignment member having an aligning hole is attached to an end portion of an optical waveguide, and an aligning pin for fitting engagement with the hole is formed in an optical element unit. By bringing the hole of the alignment member and the pin of the optical element unit into fitting engagement with each other, this method automatically aligns the core of the optical waveguide and the optical element with each other so as to be capable of light propagation.

RELATED ART DOCUMENT

Patent Document

PTL 1: JP-A-2009-223063

SUMMARY OF INVENTION

However, the aforementioned method performs the alignment simply but cannot properly achieve the light propagation in some cases. Specifically, the aforementioned method requires the alignment member to be attached to the optical waveguide. At this time, there are cases where misalignment between the alignment member and the optical waveguide occurs. Even when the hole of the alignment member and the pin of the optical element unit are brought into fitting engagement with each other, the occurrence of this misalignment results in a failure of alignment between the core of the optical waveguide and the optical element of the optical element unit. As a result, proper light propagation cannot be achieved.

In view of the foregoing, it is therefore an object of the present invention to provide an opto-electric hybrid module in which a core of an optical waveguide of an opto-electric hybrid unit and an optical element of an optical element unit are aligned with each other simply and precisely.

To accomplish the aforementioned object, an opto-electric hybrid module according to the present invention comprises: an optical element unit including an optical element; and an opto-electric hybrid unit including an electric circuit board and an optical waveguide which are stacked together, the optical element unit and the opto-electric hybrid unit being coupled together so as to be capable of light propagation, the optical element unit including an aligning fitting portion positioned and formed in a predetermined position with respect to the optical element, the opto-electric hybrid unit including a to-be-fitted portion positioned and formed in a predetermined position with respect to an end surface of a core for an optical path of the optical waveguide, the optical element unit and the opto-electric hybrid unit being coupled together, with the fitting portion of the optical element unit and the to-be-fitted portion of the opto-electric hybrid unit in fitting engagement with each other, whereby the optical element and the core for an optical path are aligned with each other so as to be capable of light propagation.

The opto-electric hybrid module according to the present invention is configured such that the optical element unit and the opto-electric hybrid unit are coupled together, with the fitting portion of the optical element unit and the to-be-fitted portion of the opto-electric hybrid unit in fitting engagement with each other. In the optical element unit, the optical element and the aligning fitting portion are in predetermined positional relationship with each other. In the opto-electric hybrid unit, the end surface of the core and the to-be-fitted portion are in predetermined positional relationship with each other. Thus, with the optical element unit and the opto-electric hybrid unit coupled together, the fitting portion and the to-be-fitted portion are in fitting engagement with each other. Therefore, the optical element of the optical element unit and the core of the opto-electric hybrid unit are automatically aligned with each other so as to be capable of light propagation. That is, the opto-electric hybrid module according to the present invention is configured such that the simple operation of bringing the aligning fitting portion of the optical element unit and the to-be-fitted portion of the opto-electric hybrid unit into fitting engagement with each other allows the precise alignment between the core and the optical element, thereby achieving proper light propagation.

In particular, when the to-be-fitted portion is a recess or a protrusion formed in or on an outer peripheral side surface of the opto-electric hybrid unit and the fitting portion of the optical element unit is a protrusion for fitting engagement with the recess of the opto-electric hybrid unit or a recess for fitting engagement with the protrusion of the opto-electric hybrid unit, the fitting structure of the fitting portion and the to-be-fitted portion is a simple structure.

DESCRIPTION OF EMBODIMENTS

Next, embodiments according to the present invention will now be described in detail with reference to the drawings.

Figure 1A:
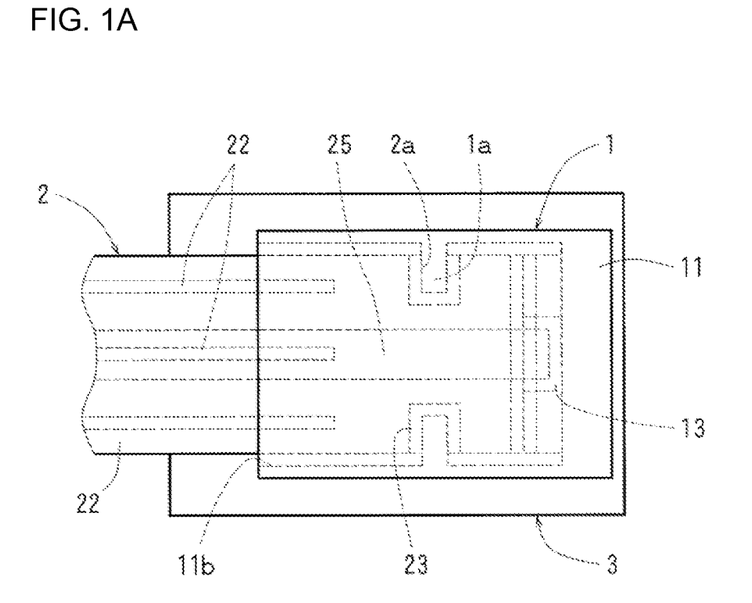
FIG. 1A is a plan view schematically showing a first embodiment of an opto-electric hybrid module according to the present invention.
Figure 1B:
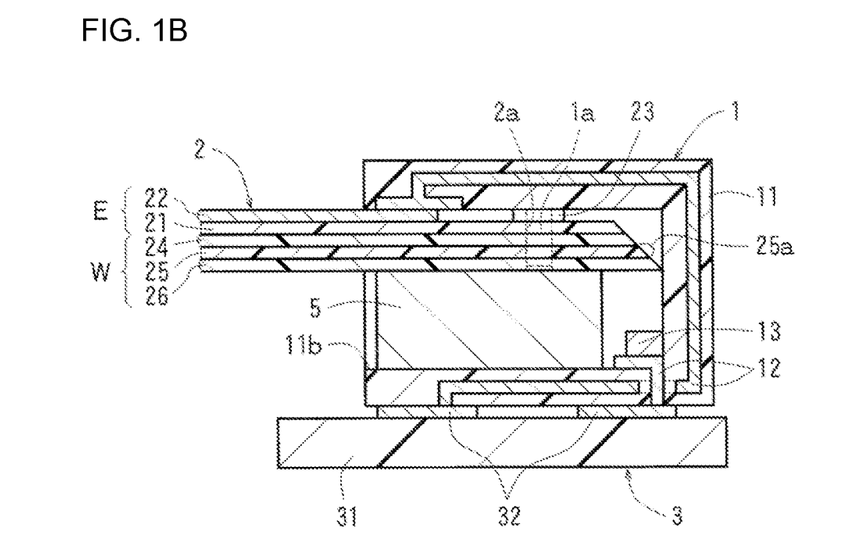
FIG. 1B is a vertical sectional view thereof.

FIG. 1A is a plan view schematically showing a first embodiment of an opto-electric hybrid module according to the present invention, and FIG. 1B is a vertical sectional view thereof. For ease of understanding of the arrangement of components and the like, only some of the components are shown in FIG. 1A. The opto-electric hybrid module of this embodiment is formed by: individually producing a connector (optical element unit) 1 having aligning protrusions (fitting portion) 1a, an opto-electric hybrid unit 2 having recesses (to-be-fitted portion) 2a for fitting engagement with the aligning protrusions 1a, and a board 3 for attaching the connector 1 thereto; bringing the aligning protrusions 1a of the connector 1 and the recesses 2a of the opto-electric hybrid unit 2 into fitting engagement with each other; and attaching the connector 1 to the board 3 in that state. Thus, the connector 1, the opto-electric hybrid unit 2 and the board 3 are integrally coupled together to form the opto-electric hybrid module. In this embodiment, a spacer 5 is fitted in a gap between the bottom of the connector 1 and the opto-electric hybrid unit 2 to fix the opto-electric hybrid unit 2 to the connector 1. When the opto-electric hybrid module is in use, the orientation (top, bottom, left and right) of the opto-electric hybrid module is not limited to that shown in FIG. 1B, and the top/bottom of the opto-electric hybrid module shown in FIG. 1B may be inverted or turned horizontally, or the left/right of the opto-electric hybrid module shown in FIG. 1B may be turned into the top/bottom thereof and the like.

In the connector 1, an optical element 13 is positioned and mounted in a predetermined position with respect to the aligning protrusions 1a. In the opto-electric hybrid unit 2, one end surface (light reflecting surface 25a) of a core 25 of an optical waveguide W is positioned and formed in a predetermined position with respect to the recesses 2a. In the opto-electric hybrid module, the fitting engagement between the aligning protrusions 1a and the recesses 2a (the coupling of the connector 1 and the opto-electric hybrid unit 2) thus causes the optical element 13 and the one end surface (light reflecting surface 25a) of the core 25 to be automatically brought into precise alignment with each other and to be arranged so that light propagation therebetween is achieved. The alignment between the board 3 and the connector 1 does not require a high precision.

Figure 2A:
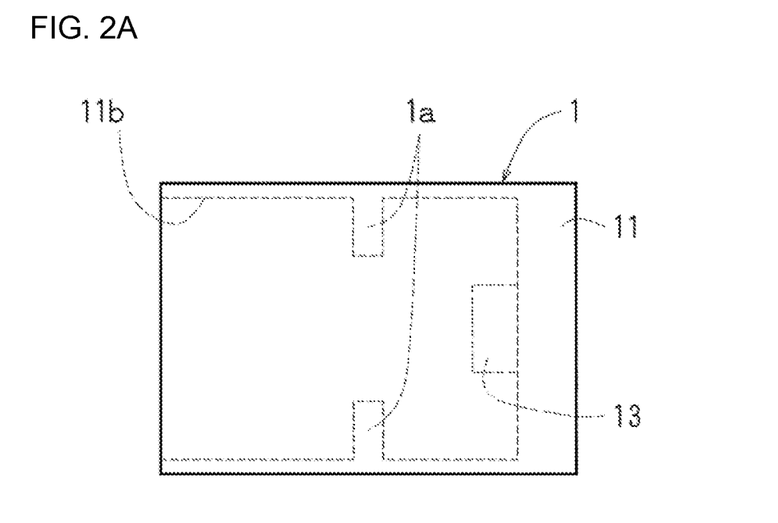
FIG. 2A is a plan view schematically showing a connector for the opto-electric hybrid module.
Figure 2B:
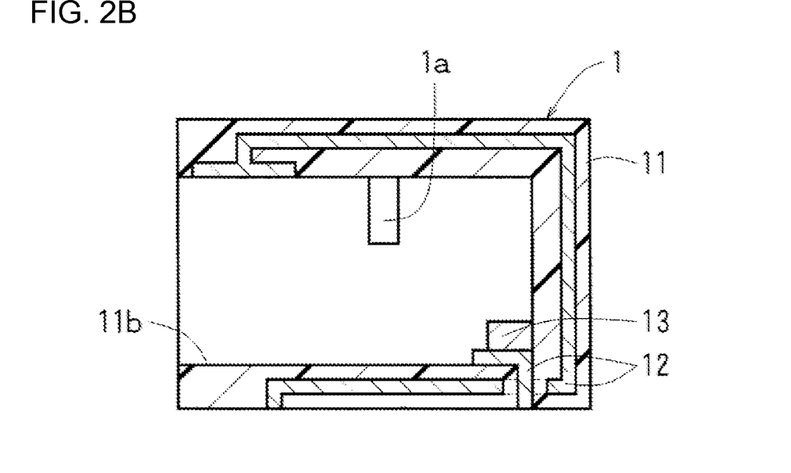
FIG. 2B is a vertical sectional view thereof.

More specifically, the connector 1 includes a connector body 11, electrical interconnect lines 12 formed in the connector body 11, and the optical element 13 electrically connected to the electrical interconnect lines 12, as shown in plan view in FIG. 2A and in vertical sectional view in FIG. 2B. The connector body 11 includes an insertion recess 11b for receiving one end portion of the opto-electric hybrid unit 2. The optical element 13 is mounted on a lower portion of an inner wall surface of the insertion recess 11b. The aligning protrusions 1a are formed respectively on upper portions of two opposed side wall surfaces (upper and lower surfaces as seen in FIG. 2A) of the insertion recess 11b. In this embodiment, the protrusions 1a are rectangular in shape as seen in plan view. The electrical interconnect lines 12 include an electrical interconnect line 12 extending through the bottom of the connector body 11, and an electrical interconnect line 12 extending from the bottom thereof through the interior of a side wall thereof to the ceiling thereof. The electrical interconnect line 12 extending through the bottom is electrically connected to the optical element 13.

Figure 3A:
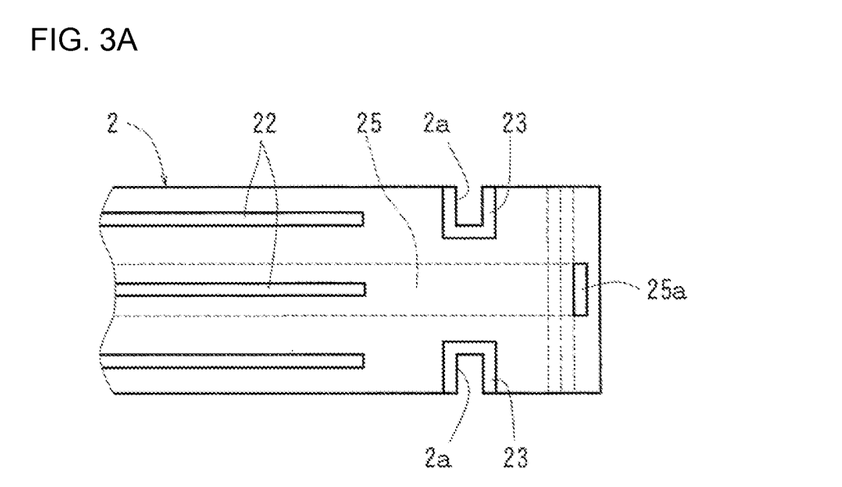
FIG. 3A is a plan view schematically showing an opto-electric hybrid unit for the opto-electric hybrid module.
Figure 3B:
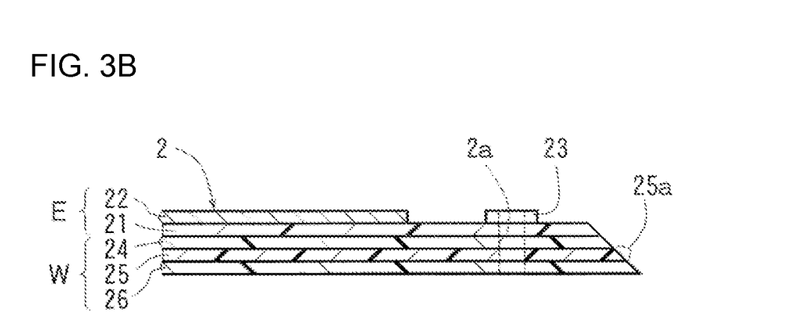
FIG. 3B is a vertical sectional view thereof.

The opto-electric hybrid unit 2 includes an electric circuit board E (upper portion as seen in FIG. 3B) and the optical waveguide W (lower portion as seen in FIG. 3B) which are stacked together, and has one end portion in the form of an inclined surface inclined at 45° with respect to the axial direction of the core 25, as shown in plan view in FIG. 3A and in vertical sectional view in FIG. 3B. The electric circuit board E includes an insulative sheet (insulating layer) 21, and electrical interconnect lines 22 and recessed recess positioning interconnect lines 23 which are formed on the upper surface of the insulative sheet 21. The optical waveguide W includes an under cladding layer 24 formed on the lower surface of the insulative sheet 21 of the electric circuit board E, the core 25 for an optical path which is formed in a linear predetermined pattern on the lower surface of the under cladding layer 24, and an over cladding layer 26 formed on the lower surface of the under cladding layer 24 so as to cover the core 25. The recesses 2a for fitting engagement with the aligning protrusions 1a are formed respectively on opposite sides (upper and lower sides as seen in FIG. 3A) of the opto-electric hybrid unit 2. The recesses 2a are formed respectively in positions corresponding to the aligning protrusions 1a (with reference to FIGS. 2A and 2B) formed in the connector 1, and have a width slightly greater than the width of the aligning protrusions 1a. In this embodiment, the recesses 2a are rectangular in shape as seen in plan view. With the opto-electric hybrid unit 2 coupled to the connector 1 (with reference to FIGS. 1A and 1B), part of the electrical interconnect lines 22 of the opto-electric hybrid unit 2 is electrically connected to the electrical interconnect line 12 at the ceiling of the connector 1.

Figure 4:
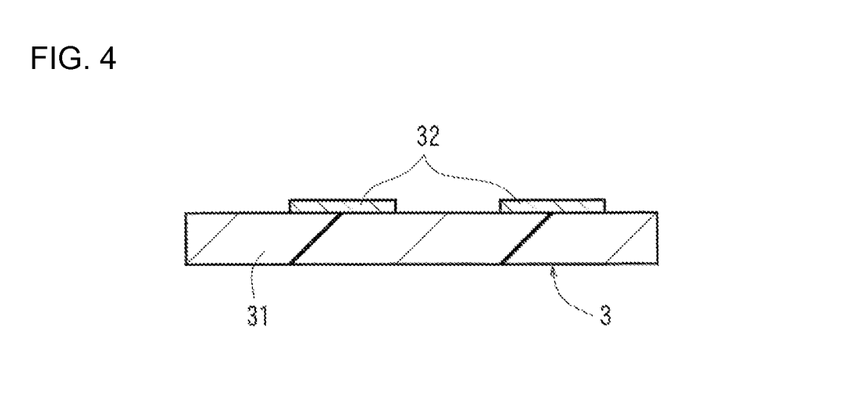
FIG. 4 is a vertical sectional view schematically showing a board for the opto-electric hybrid module.

The board 3 includes an insulative substrate 31, and electrical interconnect lines 32 formed on a surface of the insulative substrate 31, as shown in vertical sectional view in FIG. 4. With the connector 1 coupled to the opto-electric hybrid unit 2 and attached to the board 3 (with reference to FIGS. 1A and 1B), part of the electrical interconnect lines 32 of the board 3 is electrically connected to the electrical interconnect line 12 at the bottom of the connector 1.

Figure 5A:
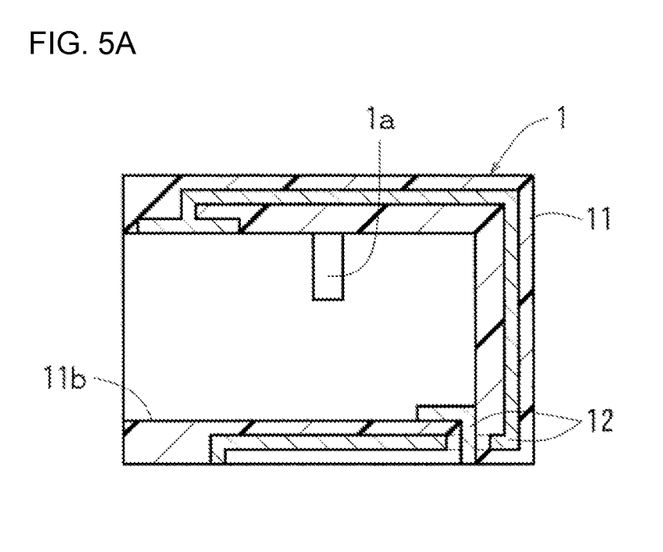
FIGS. 5A and 5B are views schematically illustrating the steps of producing the connector.
Figure 5B:
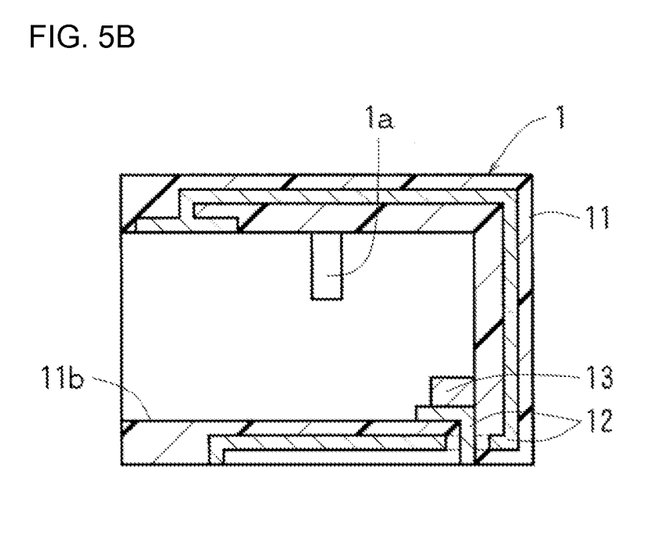

The opto-electric hybrid module is manufactured by undergoing the following process steps (1) to (4):

(1) the step of producing the connector 1 (with reference to FIGS. 5A and 5B);

(2) the step of producing the opto-electric hybrid unit 2 (with reference to FIGS. 6A to 6F);

(3) the step of producing the board 3 (with reference to FIGS. 7A and 7B); and (4) the step of coupling one end portion of the opto-electric hybrid unit 2 to the connector 1 (with reference to FIG. 8) and thereafter attaching the connector 1 in that state to the board 3.

[(1) Step of Producing Connector 1]

The step of producing the connector 1 in (1) will be described. First, the electrical interconnect lines (with reference to FIG. 5A) are formed by punching out from a metal plate and then bending the punched portions of the metal plate, for example. Next, as shown in FIG. 5A, the connector body 11 made of resin is formed by molding in such a manner that the electrical interconnect lines 12 are embedded therein. The aligning protrusions 1a are formed integrally with the connector body 11. Then, as shown in FIG. 5B, the optical element 13 is mounted in a proper position with reference to the aligning protrusions 1a. The connector 1 is produced in this manner.

[(2) Step of Producing Opto-Electric Hybrid Unit 2]

The step of producing the opto-electric hybrid unit 2 in (2) will be described. First, the insulative sheet 21 (with reference to FIG. 6A) made of an insulative material such as polyimide resin is prepared. This insulative sheet 21 has a thickness in the range of 5 to 15 µm, for example.

Figure 6A:
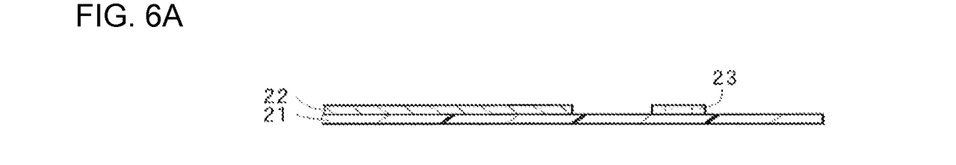
FIGS. 6A to 6F are views schematically illustrating the steps of producing the opto-electric hybrid unit.

Next, as shown in FIG. 6A, the electrical interconnect lines 22 and the recessed recess positioning interconnect lines 23 are simultaneously formed on one surface (upper surface as seen in FIG. 6A) of the insulative sheet 21. For example, a semi-additive method is used for the formation of the electrical interconnect lines 22 and the recess positioning interconnect lines 23.

In the semi-additive method, a metal layer (having a thickness on the order of 60 to 260 nm) is initially formed on one surface of the insulative sheet 21 by sputtering, electroless plating and the like. This metal layer becomes a seed layer (a layer serving as a basis material for the formation of an electroplated layer) for a subsequent electroplating process. Then, a photosensitive resist is stacked onto the opposite surfaces of a stack comprised of the insulative sheet 21 and the seed layer. Thereafter, a photolithographic process is performed to form holes having the pattern of the electrical interconnect lines 22 and the recess positioning interconnect lines 23 at the same time in the photosensitive resist on the side where the seed layer is formed, so that surface portions of the seed layer are uncovered at the bottoms of the holes. Next, electroplating is performed to form electroplated layers (having a thickness on the order of 5 to 20 µm) in a stacked manner on the surface portions of the seed layer uncovered at the bottoms of the holes. Then, the photosensitive resist is stripped away using a sodium hydroxide aqueous solution and the like. Thereafter, part of the seed layer on which the electroplated layers are not formed is removed by soft etching, so that stack portions comprised of the remaining seed layers and the electroplated layers are formed into the electrical interconnect lines 22 and the recessed recess positioning interconnect lines 23.

Figure 6B:
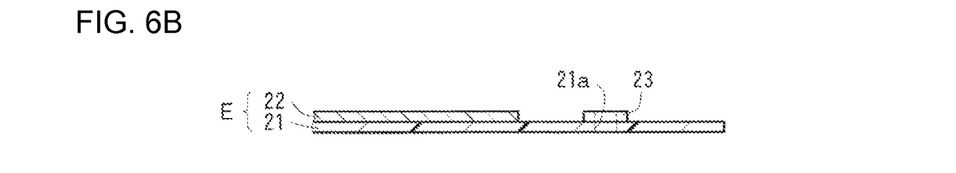

Then, as shown in FIG. 6B, parts of the insulative sheet 21 corresponding to the recessed portions (future recess regions) of the recessed recess positioning interconnect lines 23 are etched away by using a chemical etchant, so that first recesses 21a serving as part of the recesses 2a are formed. An exemplary method of forming the first recesses 21a is as follows. A surface on the electrical interconnect lines 22 side and a surface on the insulative sheet 21 side are photographed by means of a camera of an exposure machine. Based on the taken images, the positions on the back surface side of the future recess regions are properly determined by using the recessed recess positioning interconnect lines 23 on the electrical interconnect lines 22 side as a guide. Next, the insulative sheet 21 side except the future recess regions is covered with a dry film resist (not shown). Next, exposed parts of the insulative sheet 21 corresponding to the future recess regions are etched away by using a chemical etchant. The etched-away parts are formed into the first recesses 21a. Thereafter, the dry film resist is stripped away using a sodium hydroxide aqueous solution and the like. The electric circuit board E is provided in this manner.

Figure 6C:
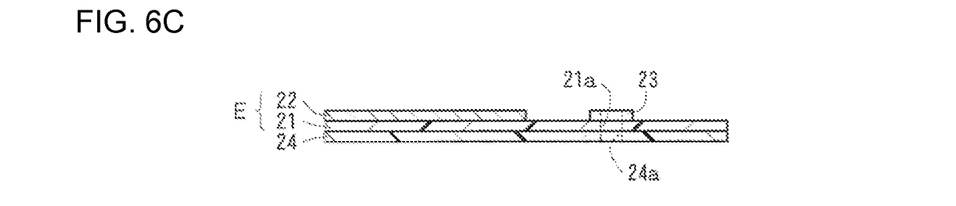

Next, as shown in FIG. 6C, the under cladding layer 24 is formed by a photolithographic process on a surface (lower surface as seen in FIG. 6C) lying on the opposite side of the insulative sheet 21 from the surface on which the electrical interconnect lines are formed. At this time, second recesses 24a coaxial with the first recesses 21a are formed in the under cladding layer 24. An example of the material for the formation of the under cladding layer 24 includes a photosensitive resin such as a photosensitive epoxy resin. The under cladding layer 24 has a thickness in the range of 5 to 50 µm, for example.

Figure 6D:
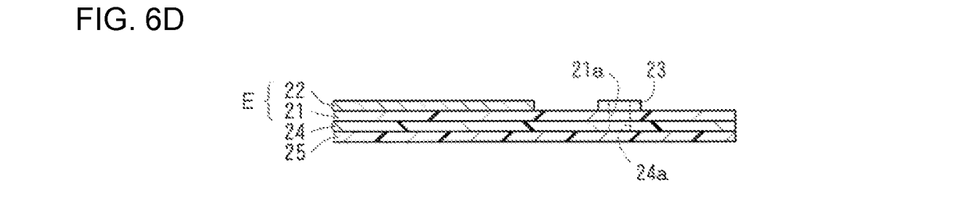

Next, as shown in FIG. 6D, the core 25 having a predetermined pattern is formed by a photolithographic process on the surface of the under cladding layer 24. At this time, a photomask for use in the formation of the core 25 is formed so as to be positioned with reference to alignment marks formed at the same time as the recess positioning interconnect lines 23. That is, the core 25 formed using the photomask is formed in a proper position with respect to the first recesses 21a. The core 25 is clear of the second recesses 24a of the under cladding layer 24. The core 25 has, for example, the following dimensions: a height in the range of 20 to 100 µm, and a width in the range of 20 to 100 µm.

Figure 6E:
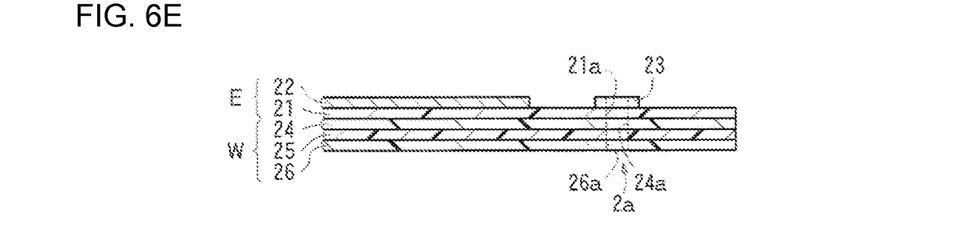

Then, as shown in FIG. 6E, the over cladding layer 26 is formed by a photolithographic process on the surface of the under cladding layer 24 so as to cover the core 25. At this time, third recesses 26a coaxial with the first and second recesses 21a and 24a are formed in the over cladding layer 26. Continuous recesses comprised of the first to third recesses 21a, 24a and 26a are the aforementioned recesses 2a. The over cladding layer 26 has a thickness (a thickness as measured from the surface of the under cladding layer 24)

in a range greater than the thickness of the core 25 and not greater than 1000 μm, for example. The optical waveguide W is formed in this manner.

Figure 6F:
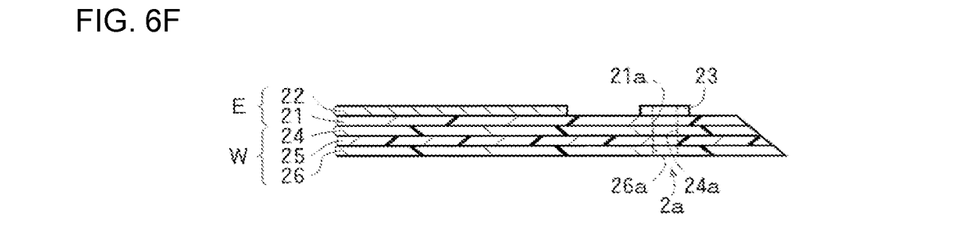

Thereafter, as shown in FIG. 6F, one end portion of a stack comprised of the electric circuit board E and the optical waveguide W is cut using a laser or a blade with reference to the aforementioned alignment marks to form an inclined surface inclined at 45° with respect to the axial direction of the core 25. One end surface of the core 25 positioned at the inclined surface is formed as the light reflecting surface 25a. This light reflecting surface 25a is formed in a proper position with respect to the first recesses 21a because the light reflecting surface 25a is formed with reference to the alignment marks formed at the same time as the recess positioning interconnect lines 23. In this manner, the opto-electric hybrid unit 2 in which the light reflecting surface 25a of the core 25 is formed in a predetermined position with respect to the recesses 2a is produced.

[(3) Step of Producing Board 3]

Figure 7A:
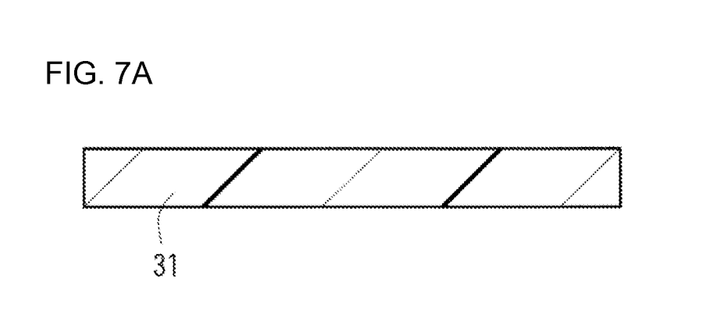
FIGS. 7A and 7B are views schematically illustrating the steps of producing the board.
Figure 7B:
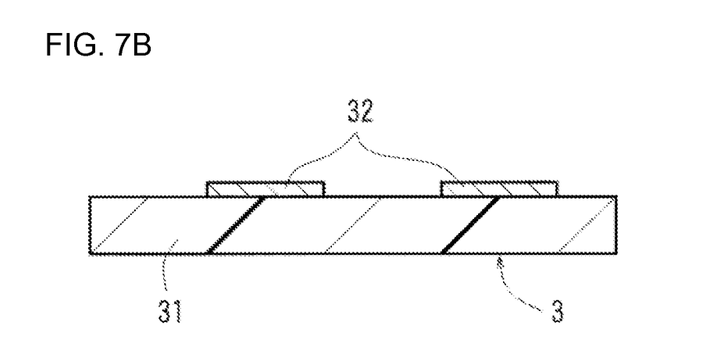

The step of producing the board 3 in (3) will be described. First, as shown in FIG. 7A, the insulative substrate 31 is prepared. Next, as shown in FIG. 7B, the electrical interconnect lines 32 are formed on a surface of the insulative substrate 31. In this manner, the board 3 including the insulative substrate 31 and the electrical interconnect lines 32 is produced.

[(4) Step of Coupling Connector 1 and Opto-Electric Hybrid Unit 2 and Thereafter Attaching Connector 1 to Board 3]

Figure 8:
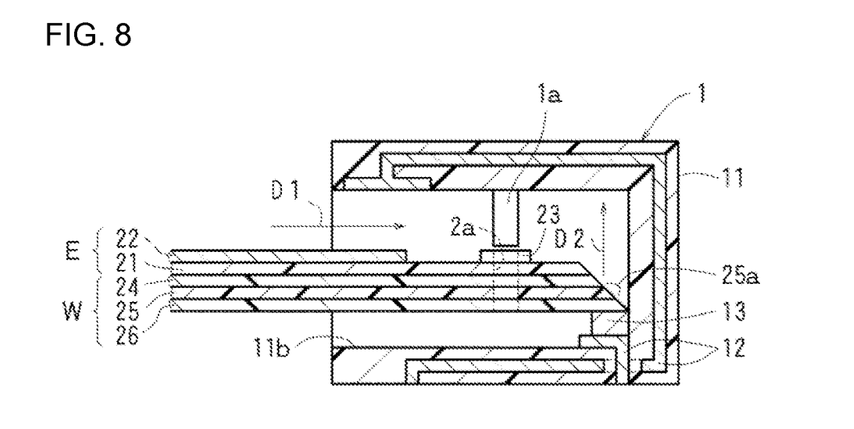
FIG. 8 is a vertical sectional view schematically showing the step of coupling the connector and the opto-electric hybrid unit together.

Next, the connector 1 and the opto-electric hybrid unit 2 are coupled to each other. This coupling is performed by inserting one end portion in the form of the inclined surface of the opto-electric hybrid unit 2 into the insertion recess 11b of the connector 1 (with reference to an arrow D1) and moving the one end portion toward the ceiling of the insertion recess 11b (with reference to an arrow D2) to bring the aligning protrusions 1a formed in the insertion recess 11b and the recesses 2a of the opto-electric hybrid unit 2 into fitting engagement with each other, as shown in FIG. 8. Thereafter, the spacer 5 is fitted in the gap between the connector 1 and the opto-electric hybrid unit 2 (with reference to FIG. 1B). Then, the connector 1 is attached to the board 3 (with reference to FIG. 1B). In this manner, an intended opto-electric hybrid module (with reference to FIGS. 1A and 1B) is produced.

In the connector 1, the optical element 13 and the aligning protrusions 1a are in predetermined positional relationship with each other, as mentioned earlier. In the opto-electric hybrid unit 2, the one end surface (light reflecting surface 25a) of the core 25 and the recesses 2a are in predetermined positional relationship with each other. Thus, coupling the connector 1 and the opto-electric hybrid unit 2 to each other by bringing the aligning protrusions 1a of the connector 1 and the recesses 2a of the opto-electric hybrid unit 2 into fitting engagement with each other automatically brings the optical element 13 and the one end surface (light reflecting surface 25a) of the core 25 into precise alignment so that light propagation therebetween is achieved.

In this manner, the simple operation of bringing the aligning protrusions 1a of the connector 1 and the recesses 2a of the opto-electric hybrid unit 2 into fitting engagement with each other allows the coupling of the connector 1 and the opto-electric hybrid unit 2 so that light propagation therebetween is achieved. Therefore, the opto-electric hybrid module is excellent in productivity.

Figure 9:
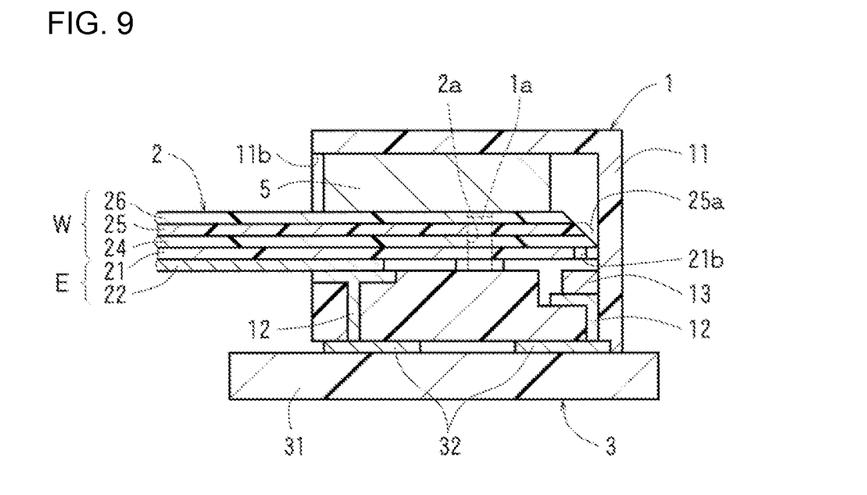
FIG. 9 is a vertical sectional view schematically showing a second embodiment of the opto-electric hybrid module according to the present invention.

FIG. 9 is a vertical sectional view schematically showing a second embodiment of the opto-electric hybrid module according to the present invention. The opto-electric hybrid module according to this embodiment is configured such that the aligning protrusions 1a formed in the connector 1 in the first embodiment shown in FIGS. 1A and 1B are formed respectively on lower portions of the side wall surfaces. Thus, the opto-electric hybrid unit 2 in an orientation vertically inverted from that in the first embodiment (with reference to FIG. 1B) (in an arrangement such that the electric circuit board E is the lower and the optical waveguide W is the upper) is in fitting engagement with the connector 1. For this reason, a through hole 21b for an optical path is formed in part of the insulative sheet 21 of the electric circuit board E which serves as an optical path. Also, the electrical interconnect lines 12 of the connector 1 extend through the bottom of the connector body 11, and are electrically connected to part of the electrical interconnect lines 22 of the opto-electric hybrid unit 2. The spacer 5 is fitted in a gap between the ceiling of the connector 1 and the opto-electric hybrid unit 2 to fix the opto-electric hybrid unit 2 to the connector 1. The remaining parts of the second embodiment are similar to those of the first embodiment. Like reference numerals and characters are used in the second embodiment to designate parts similar to those of the first embodiment. The second embodiment produces functions and effects similar to those of the first embodiment.

Figure 10:
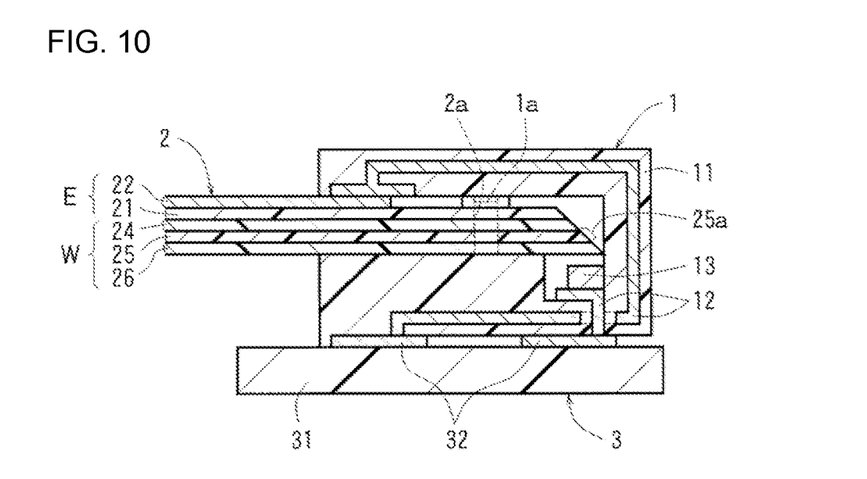
FIG. 10 is a vertical sectional view schematically showing a third embodiment of the opto-electric hybrid module according to the present invention.

FIG. 10 is a vertical sectional view schematically showing a third embodiment of the opto-electric hybrid module according to the present invention. The opto-electric hybrid module according to this embodiment is configured such that the aligning protrusions 1a formed in the connector 1 in the first embodiment shown in FIGS. 1A and 1B are formed respectively on lower portions of the side wall surfaces and such that the top of the connector 1 is openable/closable or attachable/detachable. The coupling of the opto-electric hybrid unit 2 to the connector 1 is performed by bringing the recesses 2a of the opto-electric hybrid unit 2, with the optical waveguide W side in the lead, into fitting engagement with the aligning protrusions 1a from above as seen in FIG. 10 while the top of the connector 1 is left open or detached, and then closing or attaching the top of the connector 1. The remaining parts of the third embodiment are similar to those of the first embodiment. Like reference numerals and characters are used in the third embodiment to designate parts similar to those of the first embodiment. The third embodiment produces functions and effects similar to those of the first embodiment.

In the first and second embodiments, the connector 1 is attached to the board 3 after the opto-electric hybrid unit 2 is coupled to the connector 1. However, the procedure may be reversed in such a manner that the opto-electric hybrid unit 2 is coupled to the connector 1 after the connector 1 is attached to the board 3.

Figure 11A:
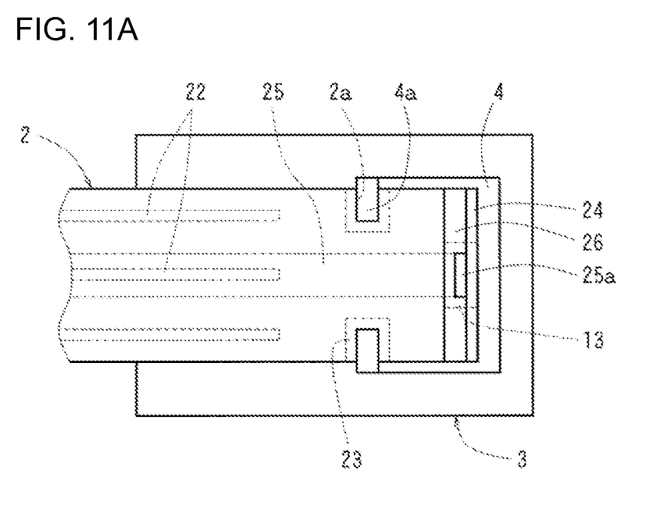
FIG. 11A is a plan view schematically showing a fourth embodiment of the opto-electric hybrid module according to the present invention.
Figure 11B:
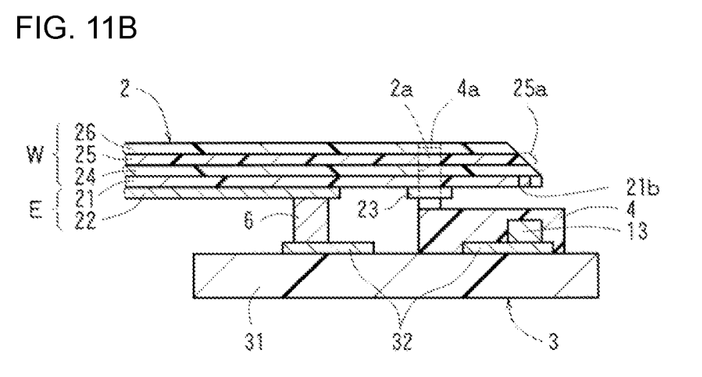
FIG. 11B is a vertical sectional view thereof.

FIG. 11A is a plan view schematically showing a fourth embodiment of the opto-electric hybrid module according to the present invention, and FIG. 11B is a vertical sectional view thereof. For ease of understanding of the arrangement of components and the like, only some of the components are shown in FIG. 11A. The opto-electric hybrid module according to this embodiment is configured such that the connector 1 (with reference to FIG. 9) is not provided in the second embodiment shown in FIG. 9 and such that the optical element 13 is mounted on the board (optical element unit) 3. Aligning protrusions 4a for fitting engagement with the recesses 2a of the opto-electric hybrid unit 2 are formed respectively on opposite sides of a transparent sealing resin part 4 for sealing the optical element 13 therein and protrude upwardly from the transparent sealing resin part 4. Thus, the alignment between the optical element 13 and one end surface (light reflecting surface 25a) of the core 25 for light propagation is performed by the fitting engagement between the aligning protrusions 4a formed on the transparent sealing resin part 4 and the recesses 2a of the opto-electric hybrid unit 2. For electrical connection between part of the electrical interconnect lines 32 of the board 3 and part of the electrical interconnect lines 22 of the opto-electric hybrid unit 2, an electrically conductive member 6 made of an electrically conductive material such as metal is provided between the electrical interconnect lines 32 and 22. The remaining parts of the fourth embodiment are similar to those of the second embodiment. Like reference numerals and characters are used in the fourth embodiment to designate parts similar to those of the second embodiment. The fourth embodiment produces functions and effects similar to those of the second embodiment.

The transparent sealing resin part 4 having the aligning protrusions 4a is formed, for example, in a manner to be described below. First, a light-transmissive mold having a mold surface in the shape of the transparent sealing resin part 4 is brought into intimate contact with a surface of the board 3 while being positioned using the optical element 13 mounted on the board 3 (using the optical element 13 as a reference for positioning). Next, a photo-curable sealing resin is injected into a mold space surrounded by the mold surface of the aforementioned mold and the surface of the board 3. The sealing resin is exposed to ultraviolet light directed through the aforementioned mold. This exposure cures the sealing resin. Thereafter, the mold is removed, so that the transparent sealing resin part 4 is obtained. In the transparent sealing resin part 4 thus formed, the aligning protrusions 4a are positioned and formed in a predetermined position with respect to the optical element 13.

Figure 12:
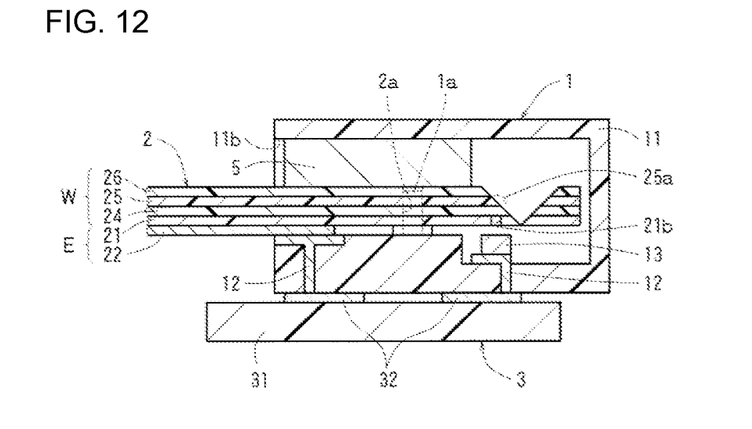
FIG. 12 is a vertical sectional view schematically showing a fifth embodiment of the opto-electric hybrid module according to the present invention.

The present invention also includes a configuration (a fifth embodiment) as shown in FIG. 12. This embodiment further includes a dummy core, which is not used for an optical path. That is, in the fifth embodiment as shown in FIG. 12, the light reflecting surface 25a is provided on one end surface of a core 25, which is the same as the aforementioned embodiments, and this is the core 25 for the optical path. However, a dummy core is also included, and the light reflecting surface 25a is not formed on the end surfaces of the dummy core.

Although two combinations of the aligning protrusions 1a or 4a and the recesses 2a for fitting engagement with the aligning protrusions 1a or 4a are formed in the aforementioned embodiments, the number of combinations of the aligning protrusions 1a or 4a and the recesses 2a may be one or less than three or more. In the figures showing the aforementioned embodiments, the aligning protrusions 1a and 4a and the recesses 2a are shown as approximately equal in height. However, the heights of the aligning protrusions 1a and 4a may be greater or smaller than the height of the recesses 2a. The aligning protrusions 1a and 4a and the recesses 2a are rectangular in shape as seen in plan view in the aforementioned embodiments, but may have a polygonal shape such as a triangular shape or be arc-shaped.

In the aforementioned embodiments, the aligning protrusions 1a or 4a are formed in the connector 1 (first to third embodiments) or in the transparent sealing resin part 4 (fourth embodiment), and the recesses 2a for fitting engagement with the aligning protrusions 1a or 4a are formed in the opto-electric hybrid unit 2. However, the places of the protrusions 1a or 4a and the recesses 2a may be exchanged. Specifically, the aligning protrusions may be formed in the opto-electric hybrid unit 2 whereas recesses for fitting engagement with the protrusions may be formed in the connector 1 or in the transparent sealing resin part 4.

Figure 13:
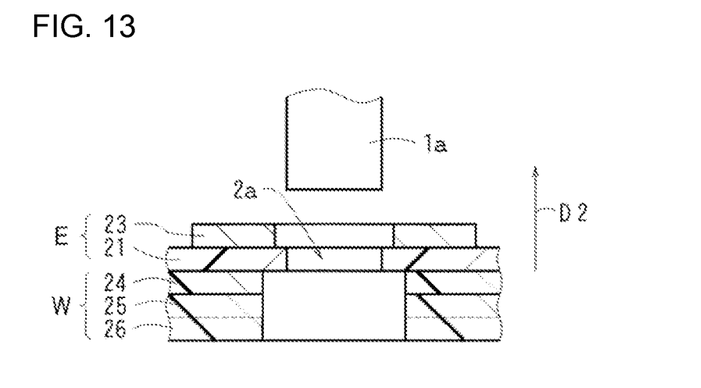
FIG. 13 is an enlarged vertical sectional view schematically showing a first modification of a to-be-fitted portion in the opto-electric hybrid unit.

In the aforementioned embodiments, the width of the recesses 2a is slightly greater than the widths of the aligning protrusions 1a and 4a for fitting engagement with the recesses 2a. However, as shown in FIG. 13, the insulative sheet 21 of the electric circuit board E may be configured to protrude slightly toward the inside of the recesses 2a. Such a configuration allows the protruding portion of the insulative sheet 21 to fill a slight gap between the outer peripheral surface of each aligning protrusion 1a or 4a and the inner peripheral surface of each recess 2a when the aligning protrusions 1a or 4a (although the protrusions 4a are not shown in FIG. 13) are brought into fitting engagement with the recesses 2a (although the fitting direction in the third embodiment shown in FIG. 10 is opposite from that in FIG. 13, so that the aligning protrusions 1a and 4a are brought into fitting engagement with the recesses 2a, with the optical waveguide W side in the lead; the same applies to the subsequent figures), thereby stabilizing the fitting engagement of the aligning protrusions 1a and 4a.

Figure 14:
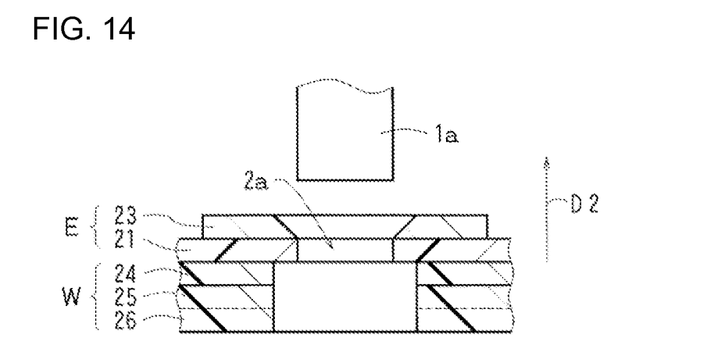
FIG. 14 is an enlarged vertical sectional view schematically showing a second modification of the to-be-fitted portion in the opto-electric hybrid unit.

In particular, a front surface portion of the recess positioning interconnect lines 23 in the first and third embodiments may be formed by cutting, grinding and the like to have an inclined surface such that a gap therein decreases gradually in the depth direction from the surface, as shown in FIG. 14. This allows the axes of the aligning protrusions 1a and 4a to easily coincide with the central axis of the recesses 2a when the aligning protrusions 1a and 4a (although the protrusions 4a are not shown in FIG. 14) are brought into fitting engagement with the recesses 2a, thereby achieving the alignment with high precision.

Figure 15A:
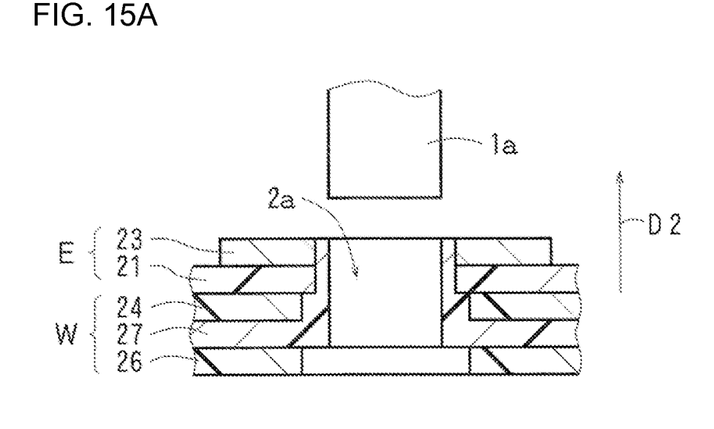
FIG. 15A is an enlarged vertical sectional view schematically showing a third modification of the to-be-fitted portion in the opto-electric hybrid unit.
Figure 15B:
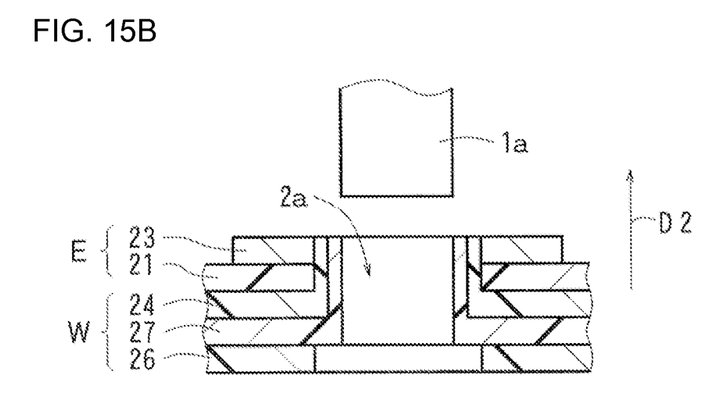
FIG. 15B is an enlarged vertical sectional view schematically showing a fourth modification of the to-be-fitted portion in the opto-electric hybrid unit.

Also, as shown in FIG. 15A, a dummy core 27 which is not used as an optical path may be formed along the peripheral portion and the inner peripheral surface of the recesses 2a at the same time as the core 25 (with reference to FIG. 6D). Alternatively, as shown in FIG. 15B, the under cladding layer 24 and the dummy core 27 may be formed along the inner peripheral surface of the recesses 2a. Such configurations also allow the portions formed along the inner peripheral surface of the recesses 2a to fill a slight gap between the outer peripheral surface of each aligning protrusion 1a or 4a (although the protrusions 4a are not shown in FIGS. 15A and 15B) and the inner peripheral surface of each recess 2a in the aforementioned manner, thereby stabilizing the fitting engagement of the aligning protrusions 1a and 4a.

Next, an inventive example of the present invention will be described in conjunction with a comparative example. It should be noted that the present invention is not limited to the inventive example.

EXAMPLES

A connector with a light-emitting element and an opto-electric hybrid unit were individually produced in the same manner as in the first embodiment (with reference to FIGS. 1A and 1B). Thereafter, the connector and the opto-electric hybrid unit were coupled to each other. Aligning protrusions had the following dimensions: a width of 1.5 mm, a depth of 1.5 mm and a height of 2.0 mm. Recesses had the following dimensions: a width of 1.55 mm, a depth of 1.55 mm and a height of 0.2 mm.

Comparative Example

In Inventive Example described above, a connector including no aligning protrusions and an opto-electric hybrid unit including no recesses were individually produced. Thereafter, light from a light-emitting element of the connector was measured through a core of the opto-electric hybrid unit. The opto-electric hybrid unit was coupled at a position where the light had the highest intensity to the connector.

In Inventive Example described above, light propagation between the light-emitting element and the core could be achieved at the same time that the connector and the opto-electric hybrid unit were coupled to each other. In Comparative Example, on the other hand, it required time to achieve the light propagation.

Although specific forms in the present invention have been described in the aforementioned inventive example, the aforementioned example should be considered as merely illustrative and not restrictive. It is contemplated that various modifications evident to those skilled in the art could be made without departing from the scope of the present invention.

The opto-electric hybrid module according to the present invention is usable when the optical element unit and the opto-electric hybrid unit are coupled together in a short time so as to be capable of light propagation.

REFERENCE SIGNS LIST

| | |
|---|---|
| E | Electric circuit board |
| W | Optical waveguide |
| 1 | Connector |
| 1a | Protrusions |
| 2 | Opto-electric hybrid unit |
| 2a | Recesses |
| 13 | Optical element |
| 25 | Core |

What is claimed is:

1. An opto-electric hybrid module comprising:
an optical element unit including an optical element;
an opto-electric hybrid unit including an electric circuit board having electrical interconnect lines and an optical waveguide which are stacked together; and
a board,
wherein the optical element unit and the opto-electric hybrid unit are coupled together so as to be capable of light propagation,
wherein the optical element unit is electrically connected with the board,
wherein the optical element unit includes a connector body including an insertion recess for receiving one end portion of the opto-electric hybrid unit, the optical element mounted on the insertion recess, an electrical interconnect line embedded in a bottom, a ceiling and a side wall of the insertion recess, and an aligning protrusion in the insertion recess positioned and formed in a predetermined position with respect to the optical element,
wherein the opto-electric hybrid unit includes a recess positioned and formed in a predetermined position on an outer peripheral side surface thereof with respect to an end surface of a core for an optical path of the optical waveguide,
wherein, on an upper surface of the opto-electric hybrid unit, a recess positioning interconnect line is formed along the recess, the recess positioning interconnect line is made of a same material as the electrical interconnect lines and is formed on a same layer as the electrical interconnect lines,
wherein the optical element unit and the opto-electric hybrid unit are coupled together, with the protrusion of the optical element unit and the recess of the opto-electric hybrid unit in fitting engagement with each other, whereby the optical element and the core for an optical path are aligned with each other so as to be capable of light propagation,
wherein the electrical interconnect line of the connector body is embedded from the bottom thereof through an interior of the side wall thereof to the ceiling thereof, and
wherein the board is electrically connected with the opto-electric hybrid unit through the electrical interconnect line of the connector body.

2. The opto-electric hybrid module according to claim 1, wherein the electric circuit board includes an insulative sheet, and
wherein the insulative sheet protrudes toward the inside of the recess.

3. The opto-electric hybrid module according to claim 1, wherein the optical waveguide further includes a dummy core,
wherein the dummy core is not used as an optical path, and
wherein the dummy core is formed along the inner peripheral surface of the recess.

4. The opto-electric hybrid module according to claim 3, wherein the optical waveguide includes a cladding layer, and
wherein the cladding layer is formed along the inner peripheral surface of the recess.

* * * * *